United States Patent Office 2,765,356
Patented Oct. 2, 1956

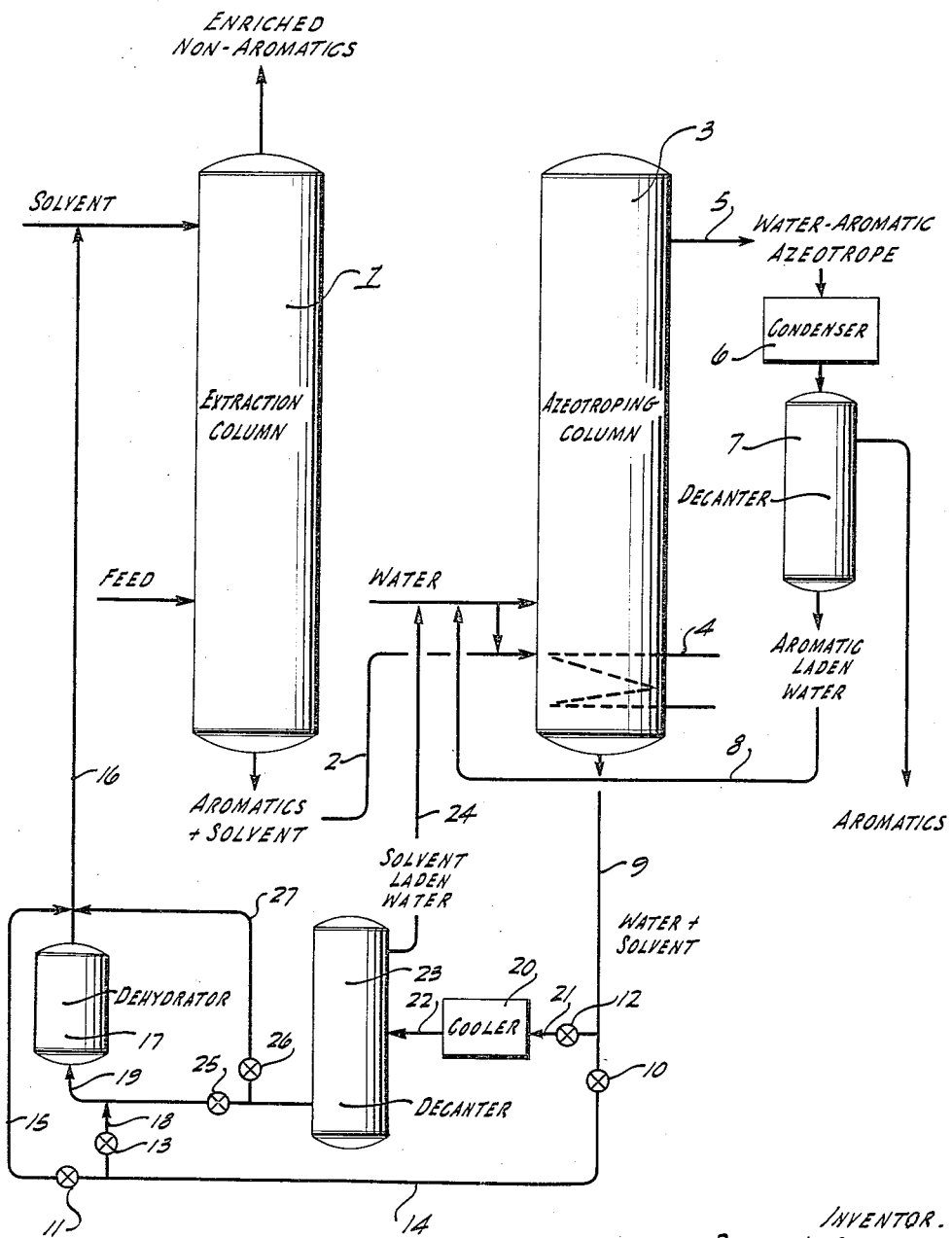

2,765,356

DISTILLATION OF HYDROCARBONS FROM SOLVENT EXTRACT IN THE PRESENCE OF WATER

Davis A. Skinner, Fullerton, Calif., assignor to Union Oil Company of California, Los Angeles, Calif., a corporation of California Application January 29, 1952, Serial No. 268,815

6 Claims. (Cl. 260—674)

This invention relates to the separation of relatively unsaturated hydrocarbons from mixtures thereof with relatively saturated hydrocarbons, particularly wherein the components of the mixture boil substantially within the same boiling range, and are therefore inseparable by ordinary fractional distillation. More particularly, the invention is concerned with solvent extraction methods wherein the unsaturated components are selectively extracted in a solvent and the solvent extract is thereafter treated by distillation with water, preferably azeotropically, to recover the unsaturated components. The term "relatively saturated" as used herein designates those compounds containing a relatively high ratio of hydrogen to carbon such as alkanes, mono-olefines, and naphthenes. The term "relatively unsaturated" designates those compounds containing a relatively low ratio of hydrogen to carbon, such as poly-olefines, aromatics, naphthalenes, etc.

The difficulty in separating hydrocarbons having similar boiling points is well recognized and many methods for effecting such separations have been suggested including chemical processes, highly complex fractional distillation processes, selective adsorption systems, azeotropic distillation processes and solvent extraction processes, both liquid phase and vapor phase. This invention is concerned with the solvent extraction processes and particularly with improvements in these processes.

U. S. Patent No. 2,441,827 describes a procedure for the selective extraction of aromatics or other unsaturates from mixtures with paraffinic or naphthenic hydrocarbons, employing certain organic nitriles as selective solvents. This extraction may be effected in the liquid phase by thoroughly mixing the nitrile with the hydrocarbon mixture, allowing the mixture to separate into two liquid phases and separating the two phases by decantation. The extraction may also be effected in the vapor phase, in which case the nitrile may be passed countercurrently to the vaporized hydrocarbon mixture in a vessel such as a fractionating column designed to cause the hydrocarbon vapors to be contacted and scrubbed by the nitrile. This latter procedure is essentially extractive distillation and results in an overhead vapor phase containing the relatively saturated hydrocarbons such as paraffins and naphthenes, and a liquid phase comprising predominantly the nitrile and the unsaturates.

Upon separation of the two phases resulting from extraction or extractive distillation, the problem is presented of recovering the aromatics, or other unsaturates, from the liquid solvent phase. The particular nitrile solvents employed have a characteristic tendency to hold or bind the dissolved aromatics quite tenaciously as a highly non-ideal solution, and separation is therefore not readily accomplished. Simple distillation or fractionation procedures may be employed, but complete recovery of aromatics is not obtainable thereby unless such high temperatures are employed as to partially decompose and/or vaporize part of the nitrile. This severe heating results in a loss of nitrile with resultant contamination of the aromatics removed as overhead and if the hydrocarbons are not completely removed by such heating process, the recycled nitrile will not present its maximum solvent power to the next charge of hydrocarbon stock.

Other methods for separating the nitriles from the aromatic solute have been proposed, for example in U. S. Patent No. 2,433,751, but none appear to be as efficient and economical as would be desirable to permit maximum total efficiency in the extraction process.

It is therefore an object of this invention to provide methods for separating the components of certain nitrile solvent extracts of aromatic hydrocarbons obtained by the extraction of hydrocarbon mixtures in such manner as to provide maximum efficiency for the total extraction process.

Another object is to provide means for the complete separation of such nitrile-hydrocarbon mixtures without loss or degradation of either component.

A broader object is to provide economical means for separating complex hydrocarbon mixtures, such as a narrow boiling fraction of cracked or dehydrogenated petroleum distillate into relatively pure saturated and unsaturated components. Petroleum fractions having a wide boiling range may likewise be resolved into such components, even though the unsaturate may occur in both the light and heavy ends of the fraction.

The above objectives, and others which will appear from the following description, may be achieved by the process illustrated in the accompanying flow sheet.

Referring more specifically to the flow sheet, reference numeral 1 denotes an extraction column designed for either liquid or gaseous countercurrent extraction. In the case of liquid phase extraction, the solvent is preferably introduced near the top of the column, and the feed material, e. g., a fraction of reformed gasoline boiling between about 200–250° F., is introduced near the bottom of the column. When the feed material is in the gaseous phase, countercurrent extraction is likewise preferred, with the solvent percolating through the column by gravity, and the gaseous feed moving upwardly.

After the solvent has dissolved a sufficient amount of relatively unsaturated hydrocarbons, it is removed from the bottom of extraction column 1 and passed through line 2, together with added water, to the bottom of azeotroping column 3 where heating element 4 vaporizes an azeotrope of water and hydrocarbon, e. g., toluene or xylene. The azeotrope is then passed overhead through line 5 to condenser 6, and thence to decanter 7 where the water and hydrocarbons separate into two liquid phases and are separately drawn off. The water phase will be saturated with hydrocarbon and is hence returned to the azeotroping column through line 8. The hydrocarbon phase will be found to consist of almost pure aromatics and/or unsaturates, containing a small amount of water. These hydrocarbons may be further purified by known methods, or by repeated selective solvent extractions.

The hot, stripped solvent is removed either periodically or continuously as bottoms through line 9 from the azeotroping column 3. This solvent will generally be found to contain an appreciable quantity of dissolved water, e. g., between 5 and 50%. In the case of $\beta,\beta'$-oxydipropionitrile, for example, the temperature in the azeotroping column is usually high enough to render it completely miscible with water. This particular solvent will therefore contain ordinarily about 30% water when it is removed hot from the azeotroping column. Other solvents may contain lesser or greater amounts of water. For reasons of azeotroping efficiency it is not desirable to remove all water from the solvent in the azeotroping column.

If the particular solvent employed contains only a small amount of water as removed through line 9, e. g., between about 3 to 10%, it may be desirable to recycle it directly to the extraction column 1. This may be accomplished by closing valves 12 and 13, and opening valves 10 and 11, whereby the solvent flows through lines 14, 15 and 16, and thence to extraction column 1.

If the solvent from azeotroping column 3 contains a larger proportion of dissolved water, e. g., above 10%, it may be desirable to partially or completely dehydrate it before it is recycled to the extraction column. To accomplish this objective, three alternative procedures, A, B, or C may be employed.

Procedure A will normally be employed for dehydrating those solvents which contain relatively large quantities of water, and in which the solubility of the water is not appreciably reduced by cooling. $\beta,\beta'$ iminodipropionitrile falls within this category. According to this procedure, the solvent from line 9 is passed directly to a dehydrator 17 where the desired amount of water is removed, as by vacuum distillation or stripping with an inert gas. This may be accomplished by closing valves 11 and 12 and opening valves 10 and 13, whereby the solvent flows through lines 14, 18 and 19 into dehydrator 17. After dehydration the solvent is then returned to the extraction column through line 16.

Procedure B will normally be applied to those solvents which contain relatively large quantities of water, but wherein the solubility of the water may be reduced to the desired level by cooling. According to this procedure, the hot solvent from line 9 is passed into a cooler 20, where it is cooled to a sufficiently low temperature, e. g., below 50° C., to give the desired separation of water as a separate phase. This is accomplished by closing valve 10 and opening valve 12 whereby the solvent flows into cooler 20 through line 21. From cooler 21 the solvent-water is passed through line 22 into a decanter 23 wherein a solvent-laden water layer forms at the top and is preferably returned through line 24 to azeotroping column 3. Since the solvent layer is assumed to be sufficiently dehydrated, valve 25 is closed and valve 26 is opened, whereby the solvent flows through lines 27 and 16 to extraction column 1.

Procedure C is preferably employed for those solvents which contain a relatively large amount of dissolved water, and in which the solubility of the water may be appreciably, but not sufficiently, reduced by cooling. In this case, the hot solvent-water is cooled and the phases separated in decanter 23 as outlined for procedure B. However, in this case valve 26 is closed, and valve 25 is opened whereby the solvent layer from decanter 23 flows through line 19 into dehydrator 17 wherein dehydration is completed to the desired extent as outlined under procedure A, and the solvent is recycled to the extraction column through line 16.

Any of the above dehydration procedures may be employed. The practical choice will rest upon the nature of the solvent employed, the amount of water which may remain therein, and other considerations of economy and engineering efficiency. The amount of water permissible in the recycled solvent depends upon the nature of the solvent and the charge stock, as well as upon the extraction conditions, but generally should not be more than about 10%. It is preferred to remove only as much water from the solvent as may be required to give maximum selectivity of solvent action without unduly impairing the solvent capacity.

The non-aromatic and relatively saturated hydrocarbons which are not dissolved by the solvent are removed from the top of extraction column 1, and may be distilled to separate small quantities, usually about 0.1%, of nitrile, which may then be recycled to the extraction column. The non-aromatics recovered as distillate will usually contain only about 1% aromatics.

The above procedure represents only one of many various procedures which may be employed. Other variations will be obvious to those skilled in the art, and still others will be mentioned hereinafter.

FEED MATERIALS

The feed material employed herein may be any mixture of relatively saturated and unsaturated organic compounds which is inseparable, or difficultly separable, by ordinary methods such as fractional distillation, and preferably wherein the relatively unsaturated, or aromatic, fraction forms a constant boiling mixture with water which mixture boils at a temperature below that of the solvent. In general it will be found that the monocyclic aromatics containing between about 6 to 10 carbon atoms are most readily recovered by the present process. These include for example, benzene, toluene, o-, m-, and p-xylene, ethyl benzenes, mesitylene.

The nitriles which I use as solvents, when mixed with or otherwise allowed to contact a mixture of hydrocarbons, have the effect of dissolving relatively unsaturated hydrocarbons to a greater extent than relatively saturated hydrocarbons contained in said mixture of hydrocarbons. For the purposes of this description, by the term relatively unsaturated hydrocarbons is meant those hydrocarbons having relatively low hydrogen to carbon ratios, and specifically those having the general formula $C_nH_{2n-2}$ or diolefins and acetylenes, $C_nH_{2n-4}$ or cyclodiolefins, and $C_nH_{2n-6}$ or aromatics, and will include also those hydrocarbons having even lower ratios of hydrogen to carbon such as naphthalene and naphthalene homologs, as well as the higher molecular weight unsaturated petroleum hydrocarbons such as are found in gas oil and lubricating oil fractions of petroleum. By the term relatively saturated hydrocarbons is meant to include those hydrocarbons having relatively high hydrogen to carbon ratios and specifically those hydrocarbons having the general formulas $C_nH_{2n+2}$ or the paraffins and $C_nH_{2n}$ or the monoolefins and the naphthenes.

Hydrocarbon mixtures comprising paraffins and aromatics; naphthenes and aromatics; monoolefins and aromatics; paraffins, naphthenes and aromatics; paraffins, monoolefins and aromatics; or naphthenes, monoolefins and aromatics may be extracted with a sufficient amount of an appropriate nitrile to dissolve and/or extract the aromatic hydrocarbons thereby leaving undissolved the hydrocarbons other than aromatics.

Although monoolefins have been classed with the paraffins and naphthenes as relatively saturated hydrocarbons their solubility in nitriles is relatively greater than that of the paraffins or the naphthenes and it is possible to separate mixtures comprising paraffins and monoolefins, or naphthenes and monoolefins by solvent extraction with a nitrile.

It is preferable that the hydrocarbon mixtures or fractions to be treated by my extraction process have a relatively narrow boiling range because, in general, the efficiency of the treatment increases as the boiling range decreases. This is particularly true in the case of relatively low molecular weight hydrocarbon fractions although the same principle applies in the case of high molecular weight fractions. Moreover, it is highly desirable that the fraction have a relatively narrow boiling temperature range when the extraction is to be effected in the vapor phase because in this case the separation is dependent not only upon the solvent action of the nitrile but also upon the relative vapor pressures of the hydrocarbons or hydrocarbon components of the fraction in the presence of the nitrile.

The liquid or vapor phase extractions may be effected at any desired pressure, the particular pressure employed in any given case being dependent in part upon the boiling temperature range of the hydrocarbon mixture being treated and upon the boiling point of the nitrile used as solvent. Pressure is not as critical in the case of liquid phase extraction as in the case of extractive distillation, in that for most purposes normal atmospheric pressure is entirely satisfactory for liquid phase extraction whereas in the case of vapor phase extraction widely different pressures, either above or below atmospheric, may be desirably employed.

SOLVENTS

The nitriles employed herein as solvents consist essentially of mono- or dinitriles, preferably aliphatic, which contain in addition one or more internally bound atoms of oxygen, sulfur or nitrogen. Of this group the dinitriles are preferred. They are generally producible by reacting an unsaturated nitrile with water, hydrogen sulfide, ammonia, or with alkyl or aryl derivatives of water (alcohols or phenols), hydrogen sulfide (mercaptans), or ammonia (amines, amides). The term "internally bound hetero atom" as used above, is intended to designate a linking hetero atom, that is, a hetero atom which is included between two carbon atoms. In addition to this chemical constitution, the nitriles also should desirably have the following characteristics:

1. A boiling point higher than the hydrocarbon-water azeotrope which is to be distilled therefrom.
2. A sufficient affinity for the dissolved aromatics to render their separation therefrom impractical by conventional distillation.
3. A high selectivity and capacity for dissolving such aromatics in preference to relatively saturated hydrocarbons.
4. A low volatility with steam, or stated differently, a negligible tendency to be steam-distilled.
5. A high chemical stability in the presence of steam or water at high temperatures, i. e., a low tendency to undergo hydrolysis.

The preferred solvents consist of the reaction products of acrylonitrile with water, hydrogen sulfide, ammonia, amines or amides. The general reaction may be as follows:

(I) 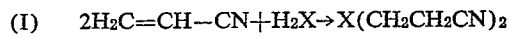  $2H_2C=CH-CN+H_2X \rightarrow X(CH_2CH_2CN)_2$ wherein X is —O—, —S—, —NH—, —N alkyl—, —N acyl— or —N aryl—. Formula I above therefore represents the preferred group of solvents. From this group may be selected $\beta,\beta'$-oxydipropionitrile, $\beta,\beta'$-thiodipropionitrile and $\beta,\beta'$-iminodipropionitrile as examples which at present appear to be most satisfactory.

A surprising feature of the present invention is the fact that these solvents, though they all contain at least two different functional groups which are susceptible to hydrolysis, are nevertheless stable under the azeotroping conditions employed. Little or no cleavage of the ether linkages, or hydrolysis of the nitrile groups occurs, even though azeotroping is performed with an excess of water at temperatures above 100° C. It is likewise a surprising phenomenon that these solvents can be so readily and completely stripped of aromatics by boiling with water, whereas prolonged heating without water at temperatures considerably above the boiling point of the aromatics fails to completely remove them.

DISTILLATION

It would appear at first sight that the solvent extract of aromatics or other unsaturates should be readily separable by fractional distillation, inasmuch as the solvents all boil at considerably higher temperatures than the usual range of hydrocarbons encountered. This is, however, not the case; the partial pressure of the hydrocarbons in the solvent is much lower than would theoretically be expected due to the peculiar affinity of the solvent for unsaturated hydrocarbons. This invention is based upon the discovery that dissolved water will, by physical and/or chemical action, raise the partial pressure of the dissolved hydrocarbons sufficiently to permit effective azeotropic distillation with water.

The azeotroping step may be performed under a variety of different conditions, either continuously or batchwise. The ratio of water to solvent-hydrocarbon may vary, usually between about 0.1 to 1.0 part by volume of water to 1 part of solvent-hydrocarbon for best results. Other ratios may be used, provided that sufficient liquid water is present throughout the distillation to permit boiling at pot temperatures below 110° C. Pressures and temperatures will vary with the particular solvent and hydrocarbon being treated. In the usual cases, atmospheric pressures are preferred from the standpoint of economy of operation. Any suitable type of still or fractionating column may be employed for azeotroping, although no fractionation is ordinarily required.

The usual aromatics encountered in reformed gasolines, such as benzene, toluene, xylenes, ethyl benzenes, etc., form azeotropes with water which boil between about 69° C. to 95° C. When azeotroping such materials it will generally be found that the temperature in the still pot may slightly exceed these limits, especially if an insufficient amount of water is employed. Ordinarily, however, temperatures above about 110° C. are not necessary, and are avoided herein, thereby minimizing decomposition of the solvent. The solvents employed herein have boiling points substantially above 110° C. and are hence very slightly vaporized.

It will be understood that the presence of liquid water throughout the distillation inherently requires that the solvent contain at all times a substantial proportion of dissolved water, along with the dissolved hydrocarbon. This dissolved water is deemed to be an important factor in recovering the hydrocarbon completely and efficiently at low temperatures.

The following specific examples serve to illustrate further the invention, but they are not to be considered as limiting.

Example I

A mixture of hydrocarbons boiling in the temperature range of about 200° F. to about 250° F. and comprising 50 parts by weight of toluene and 50 parts by weight of non-aromatic hydrocarbons is passed into a fractionating column at a point near the bottom of the column. The column is maintained at normal atmospheric pressure and at a still-head temperature of 252° F. Methylmercaptopropionitrile, which is used as solvent, is passed into the same fractionating column at a point near the top of the column at the rate of 15 parts by weight of methylmercaptopropionitrile to 1 part by weight of the hydrocarbon mixture entering the column. Under these conditions the non-aromatic hydrocarbons distill and are obtained as an overhead fraction, and a mixture of toluene and methylmercaptopropionitrile, substantially completely separated from non-aromatic hydrocarbons, is obtained as a bottoms fraction.

The bottoms fraction is mixed with about one-half its volume of water and passed into a heated still and brought to boiling at an initial still pot temperature of about 90° C. The toluene-water azeotrope passes overhead and is condensed to form two phases which are separated by decantation to yield almost pure toluene, and a toluene-saturated water layer which is recycled with another batch of solvent-toluene. The methylmercaptoproprionitrile is removed from the still as bottoms and recycled directly to the extraction column.

Example II

A benzene fraction of hydroformed gasoline boiling in the temperature range of about 150° F. to about 200° F. and comprising approximately 50 parts by weight of benzene and 50 parts by weight of non-aromatic hydrocarbons is passed into a packed extraction column at a point near the bottom of the column and $\beta,\beta'$-thiodipropionitrile is passed into the same column at a point near the top of the column at the rate of 7.5 parts by weight of $\beta,\beta'$-thiodipropionitrile to 1 part by weight of the benzene fraction. The column is maintained at a temperature of about 150° F. and at ordinary atmospheric pressure.

Raffinate phase is withdrawn from the top of the column at a rate corresponding to 25 parts by weight, and extract phase is withdrawn from the bottom of the column at a rate corresponding to 75 parts by weight of the total feed to the column. The raffinate phase comprising non-aromatic hydrocarbons and small amounts of dissolved β,β'-thiodipropionitrile is passed to a distillation column where the non-aromatic hydrocarbons vaporize and distill leaving β,β'-thiodipropionitrile as a residue.

The extract phase comprising β,β'-thiodipropionitrile and benzene is then passed, together with about one-third its volume of water, into a distillation column where benzene-water azeotrope is formed as an overhead by boiling the mixture at an initial still pot temperature of about 89° C. Boiling is continued with addition of water until no further benzene comes over in the distillate. The overhead is then condensed and the two phases separated by decantation as in Example I. The β,β'-thiodipropionitrile is removed as bottoms and cooled to about 20° C., whereupon a water phase of about 10% by volume separates from the solvent. The solvent-laden water phase is returned to the distillation column with the incoming solvent-benzene. The residual solvent contains only about 1% of water and is recycled without further dehydration to the extraction column.

*Examples III*

A mixture of hydrocarbons boiling in the temperature range of about 250° F. to about 300° F. and comprising 50 parts by weight of xylene and 50 parts by weight of non-aromatic hydrocarbons is passed as a liquid into a packed extraction column at a point near the bottom of the column and β,β'-oxydipropionitrile is passed into the same column at a point near the top of the column at the rate of 7.5 parts by weight of β,β'-oxydipropionitrile to 1 part by weight of the mixture of hydrocarbons entering the column. The column is maintained at a temperature of about 180° F. and at normal atmospheric pressure.

Raffinate phase is produced from the top of the column at a rate corresponding to 25 parts by weight and extract phase is produced from the bottom of the column at a rate corresponding to 75 parts by weight of the total feed to the column, i. e., hydrocarbon feed and solvent. The raffinate phase comprising non-aromatic hydrocarbons and small amounts of dissolved β,β'-oxydipropionitrile is passed to distillation column where the non-aromatic hydrocarbons are vaporized leaving β,β'-oxydipropionitrile as a residue.

The extract phase comprising essentially xylene and β,β'-oxydipropionitrile is then passed, together with about one-quarter its volume of water, into a distillation column where xylene-water azeotrope is formed as an overhead by boiling the mixture at an initial still pot temperature of about 95° C. Boiling is continued with addition of water until no further xylene comes over in the distillate. The overhead is then condensed and the two phases separated as in Example I. The β,β'-oxydipropionitrile is continuously removed as bottoms and cooled to about 20° C., whereupon a water phase of about 30% by volume separates from the solvent and is recycled to the distillation column. The residual solvent contains about 9% water, and in order to reduce this water content further, hot air at about 150° C. is blown through the solvent for about one-half hour until the water content is reduced to about 3%. The dehydrated solvent is then recycled to the extraction column.

*Example IV*

The procedure of Example III is repeated using β,β'-iminodipropionitrile as the solvent. The results are substantially the same, but inasmuch as this solvent is miscible with water at 25° C., the stripped solvent removed as bottoms from the azeotroping column is, without cooling, blown with hot air to reduce the water content to below about 5%. The partially dehydrated solvent is then recycled to the extraction column.

*Example V*

In order to test the stability of the solvents employed herein under prolonged and severe hydrolysis conditions, a synthetic mixture of 10 ml. (8.66 gms.) of toluene and 100 ml. (104 gms.) of β,β'-oxydipropionitrile was prepared. To this mixture was added 25 ml. of water. The whole mixture was heated to boiling (96° C.). The toluene was recovered quantitatively and separated from the water by decantation. This process was repeated for 50 cycles, entailing a total heating time of approximately 12 hours, during which the pot-temperature ranged from 96° C. to 110° C. Analysis of the final toluene overhead product by infra-red spectrophotometry showed it to be free of the solvent. Only traces of acrylonitrile were noted in the overhead and no decomposition or hydrolysis products of the solvent were found in the bottoms.

This experiment was repeated for 50 cycles employing β,β'-thiodipropionitrile as solvent. Substantially the same results were obtained.

In contrast to the above experiments, a solution of 10 ml. of toluene in 100 ml. of β,β'-oxydipropionitrile was heated without water in an attempt to recover the toluene. The initial boiling point was 150° C., and complete recovery was not realized before marked decomposition of the solvent occurred.

The foregoing description is not to be taken as in any way limiting but merely as illustrative of my invention, for many variations may be made by those skilled in the art without departing from the spirit or the scope of the following claims.

I claim:

1. A process for separating an aromatic monocyclic hydrocarbon containing between 6 and 10 carbon atoms from a lyophyllic solution thereof in a solvent having the formula:

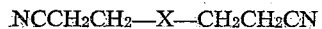
$$NCCH_2CH_2—X—CH_2CH_2CN$$

wherein X is selected from the group consisting of oxygen and sulfur, which comprises subjecting said solution to azeotropic distillation at approximately atmospheric pressure in the presence of between about .1 and 1 volume-proportion of liquid water per volume of extract and at a pot temperature below about 110° C., whereby an azeotropic overhead of water and aromatic hydrocarbon is obtained, condensing said overhead and separating aromatic hydrocarbons therefrom.

2. A process according to claim 1 wherein said solvent is β,β'-thiodipropionitrile.

3. A process according to claim 1 wherein said solvent is β,β'-oxydipropionitrile.

4. A process for separating aromatic monocyclic hydrocarbons containing between 6 and 10 carbon atoms from a mixture thereof with non-aromatic hydrocarbons boiling in the same range which comprises extracting said mixture with a solvent having the formula:

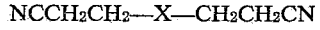
$$NCCH_2CH_2—X—CH_2CH_2CN$$

wherein X is selected from the group consisting of oxygen and sulfur, separating a raffinate phase rich in non-aromatic hydrocarbons and an extract phase rich in aromatic hydrocarbons, subjecting said extract phase to azeotropic distillation at approximately atmospheric pressure in the presence of between about 0.1 and 1 volume of liquid water per volume of extract and at a pot temperature below about 110° C., whereby an azeotropic overhead of water and aromatic hydrocarbon is obtained, continuing said azeotropic distillation under the stated conditions until substantially all of said aromatic hydrocarbons have distilled overhead, then partially dehydrating the solvent-water bottoms from said azeotropic distillation by cooling the same to a temperature below about 50° C. and separating the resulting aqueous phase, whereby the water content of the solvent phase is reduced to less than about 10% by volume, and recycling the partially dehydrated solvent to said extraction step.

5. A process according to claim 4 wherein said solvent is β,β'-thiodipropionitrile.

6. A process according to claim 4 wherein said solvent is β,β'-oxydipropionitrile.

References Cited in the file of this patent

UNITED STATES PATENTS

| | | |
|---|---|---|
| 2,363,158 | Stasse | Nov. 21, 1944 |
| 2,388,834 | Douslin et al. | Nov. 13, 1945 |
| 2,415,921 | Wagner | Feb. 18, 1947 |
| 2,439,534 | Wilkes | Apr. 13, 1948 |
| 2,568,159 | Medcalf et al. | Sept. 18, 1951 |
| 2,568,176 | Vriens et al. | Sept. 18, 1951 |

OTHER REFERENCES

Horsley: "Analytical Chemistry," vol. 19, page 510 (1947).

Weissberger: Distillation, Interscience Publishers, Inc., New York (1951), pages 357, 374 and 375.

Medcalf et al.: "Aromatics Recovery by Solvent Refining," Petroleum Refiner, July 1951, pages 97–100.